June 23, 1931. T. CARDWELL 1,810,893
JOURNAL BOX JACK
Filed April 2, 1928  2 Sheets-Sheet 1
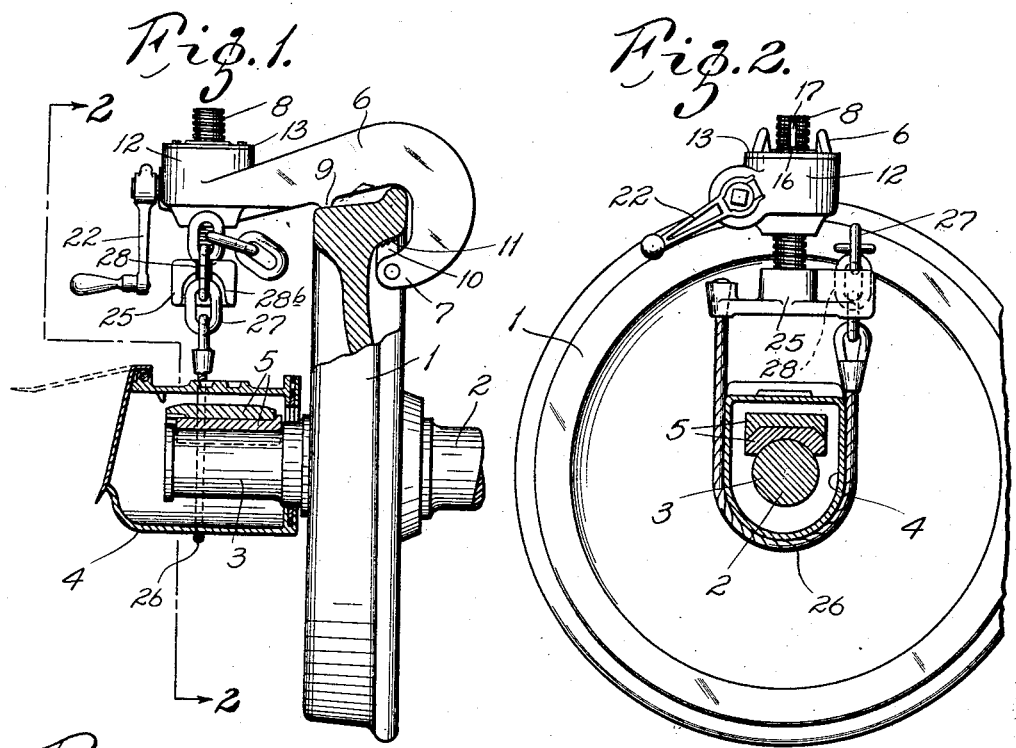
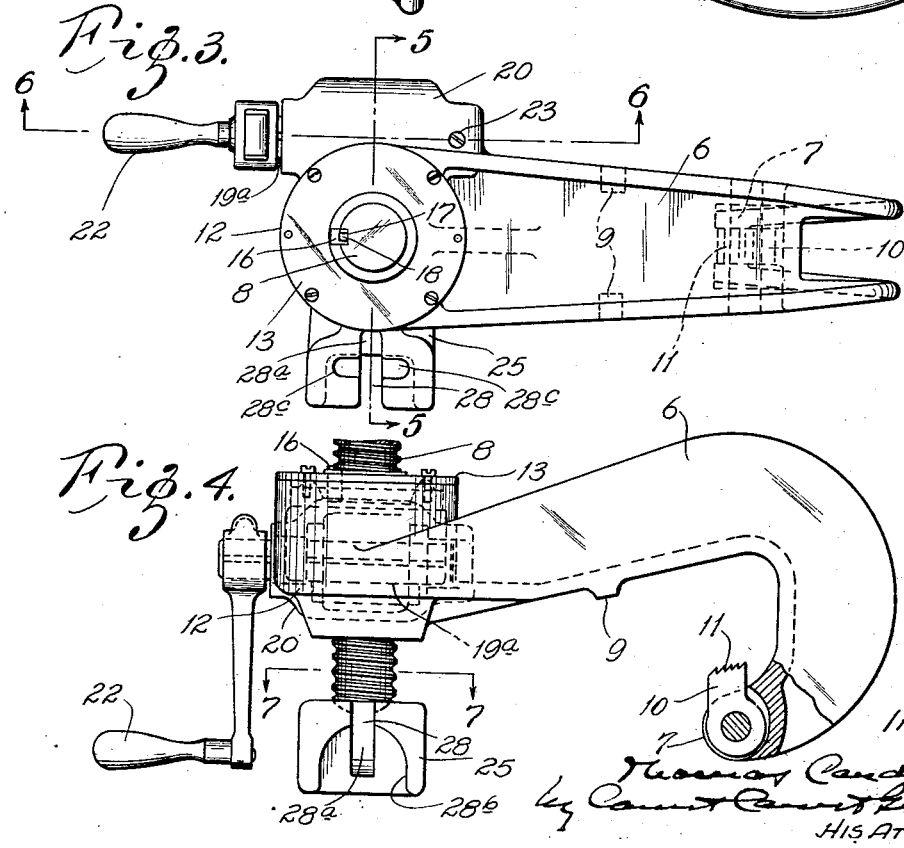
INVENTOR
Thomas Cardwell
HIS ATTORNEYS June 23, 1931.  T. CARDWELL  1,810,893
JOURNAL BOX JACK
Filed April 2, 1928  2 Sheets-Sheet 2
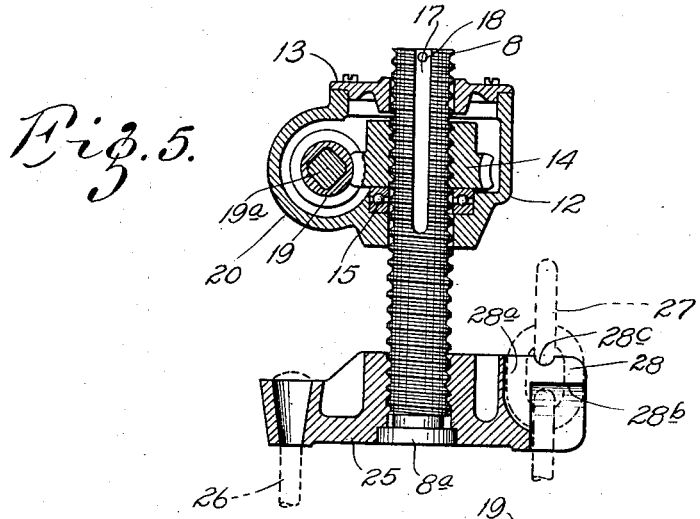
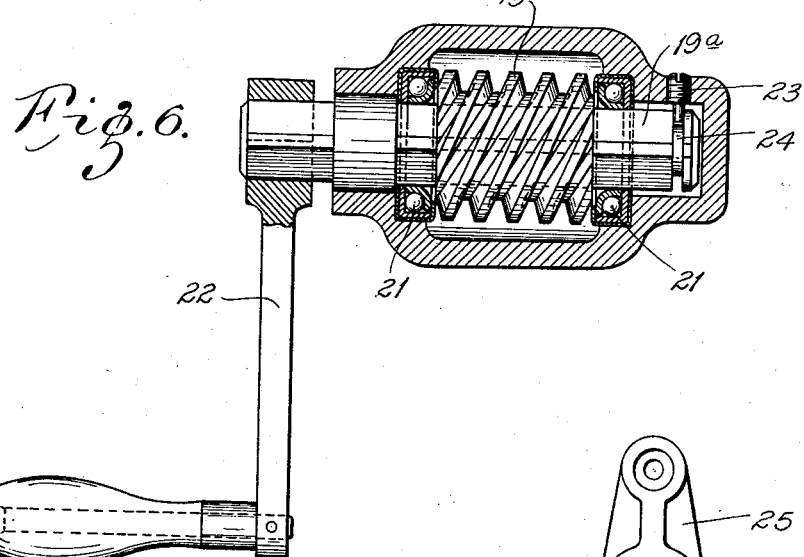
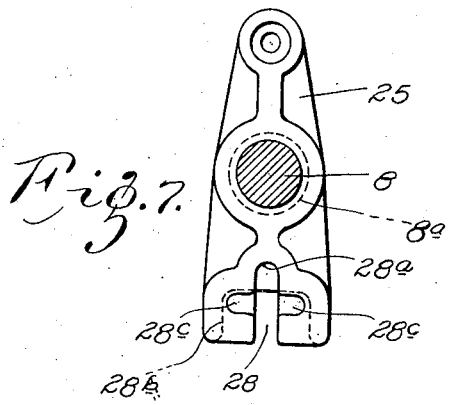
INVENTOR:
Thomas Cardwell
by Cameret Cameret Groseby
HIS ATTORNEYS.

Patented June 23, 1931

1,810,893

UNITED STATES PATENT OFFICE

THOMAS CARDWELL, OF ST. LOUIS, MISSOURI

JOURNAL BOX JACK

Application filed April 2, 1928. Serial No. 266,524.

This invention relates to jacks adapted to be attached to car wheels and engaged with the journal boxes for lifting the latter when it is desired to remove the journal bearings therefrom.

The invention has for its principal objects to provide a suspension journal box jack of light weight and of great strength and rigidity that can be firmly attached to the car wheel and readily engaged with the journal box. Other objects are simplicity and cheapness of construction and compactness of design.

The invention consists in the improved suspension jack and in the construction, combinations and arrangements of parts hereinafter described and claimed.

In the accompanying drawings, which form part of the specification and wherein like symbols refer to like parts wherever they occur, Fig. 1 is a side elevation of my suspension jack shown applied to a car wheel and journal box, the journal box being shown lifted off the journal bearing and said journal box and the upper portion of said wheel being shown in section;

Fig. 2 is an end view of the parts shown in Fig. 1, the journal box being shown in section on the line 2—2 in Fig. 1;

Fig. 3 is an enlarged plan view of the jack;

Fig. 4 is a side elevation thereof;

Fig. 5 is a vertical section on the line 5—5 in Fig. 3;

Fig. 6 is a vertical section on the line 6—6 in Fig. 3; and

Fig. 7 is a horizontal section on the line 7—7 in Fig. 4.

Referring to Figs. 1 and 2 of the accompanying drawings, my invention is shown applied to a car wheel 1 fixed to one end of an axle 2 having a journal 3 located in a journal box 4 and supporting the usual journal bearings or brasses 5.

The present journal box jack comprises a suspension bracket or hanger 6 of substantially channel-shaped cross-section which is provided at its inner end with a downwardly extending hook 7 adapted to embrace the flange of the car wheel 1 at the top thereof. The outer end of the hanger or bracket overhangs the journal box 4 and carries a vertically adjustable lifting screw 8. The suspension bracket or hanger 6 is provided at its side edges with downwardly projecting lugs 9 adapted to bear against the tread of the wheel on opposite sides of the vertical center line thereof; and the hooked shaped inner end portion 7 of said hanger extends beneath the rim of the wheel and has a dog 10 pivoted thereto for vertical swinging movement thereon. The free outer end of the pivotal dog 10 is provided with teeth 11 adapted to bite into the inner peripheral surface of the rim of the wheel. By the arrangement described, the dog 10 engages the inner periphery of the wheel at the vertical center line thereof while the lugs 9 bear on the tread of the wheel on opposite sides of said center line, thereby preventing cross tilting of said bracket and downward swinging movement of the outer end thereof, while the pivotal dog permits the angular portion of the bracket to be adjusted to bring the lifting screw 8 into a substantially vertical position.

The lifting screw is located in a housing 12 formed in the outer end of the bracket 6 and passes loosely through axial alined openings provided therefor in the bottom of said housing and in a removable cover plate 13 therefor. Said lifting screw is threaded through a worm gear 14 rotatably supported in said housing on suitable bearings 15 in the lower portion thereof. The lifting screw 8 is held against rotation preferably by means of a key 16 carried by the cover plate 13 and engaging a longitudinal groove 17 in the peripheral surface of said screw. Downward movement of the screw is limited preferably by means of a pin 18 which is located in the upper end of the groove 17 in said screw in position to abut against the key 16.

The worm gear 14, which serves as a nut for the screw 8, is rotated to cause said screw to move up and down in the outer end of the hanger 6 by means of a worm 19 fixed to a horizontal shaft 19a journaled in a housing 20 provided therefor at one side of the worm gear housing 12. The worm shaft 19a is rotatably supported in the housing 20 provided therefor by means of ball roller bearings 21 and is rotated by means of a crank handle 22 fixed to a portion which extends beyond the front end of the worm housing of said shaft. Longitudinal movement of the worm shaft 19 is prevented by means of a screw 23 which is threaded through the wall of the housing and engages a circumferential groove 24 in the inner end portion of said shaft. By this arrangement the screw 8 is made to ascend or descend by turning the crank handle 22.

The lower end of the screw has a cross bar 25 threaded thereon, said arm being retained on the lower end of said screw by means of a head 8a formed on the lower end thereof. A cable 26 has one end permanently secured to one end of the cross bar 25 and is provided at its free outer end with a section of chain 27. The other end of the cross bar 25 is provided with a recess 28 whose upper portion 28a is shaped to receive a link that is disposed longitudinally of said bar and whose lower portion 28b is shaped to receive a link that is disposed crosswise of said bar; and the upper portion of said end of said bar is provided on opposite sides of the upper portion 28a of said chain receiving recess with grooves 28c which form seats for the lower portion of a link that is disposed crosswise to said bar. By this arrangement, the free end of the journal box supporting cable may be readily attached to the cross bar by positioning a link crosswise of the cross bar with its lower portion seated in the oppositely arranged seats or grooves 28c and with the two links located therebelow snugly engaged within the portions 28a and 28b of the recess 28. With the links of the chain thus engaged within the recess provided therefor in the cross bar it is securely held thereon and is prevented from turning or twisting.

By the arrangement described, when it is desired to lift the journal box, the jack may be readily attached to the car wheel by hooking the hooked-shaped inner end of the suspension bracket 6 around the top of the wheel flange with the teeth of the pivotal dog 10 in engagement with the inner periphery of the rim of the wheel at the vertical center line thereof and with the lugs or projections on the bottom of said bracket bearing against the tread of the wheel on opposite sides of said center line. The free end of the cable 26 is then passed beneath the journal box and the chain 27 attached to the cross-arm bar 25 by inserting the links of said chain in the recess 28 provided therefor in said bar. The journal box is then lifted off the journal bearings far enough to permit the same to be removed and replaced by rotating the crank handle 22 on the forward end of the worm shaft 19 in a direction which will cause the lifting screw to move upwardly. To remove the jack, the crank arm is rotated to cause the lifting screw to move downwardly far enough to take the weight off of the cable, after which the chain on the free end of the cable may be detached from the cross-bar. The jack can then be removed from the car wheel by swinging its outer end upwardly to disengage the toothed dog from the inner periphery of the rim of the wheel.

Obviously the hereinbefore described journal box jack admits of considerable modification without departing from the invention; therefore, I do not wish to be limited to the precise details of construction shown and described.

What I claim is:

1. A journal box suspension jack comprising a hanger member adapted to bear against the tread of a car wheel and having an integral hooked inner end portion adapted to embrace the flanged edge of the rim of said wheel at the top thereof, a dog pivoted on the hooked portion of said hanger in position to bear against the inner periphery of said rim, a vertically movable lifting screw mounted on the outer end of said hanger, and a flexible member carried by said screw for suspending the journal box therefrom.

2. A journal box suspension jack comprising a hanger member of substantially channel-shaped cross section having a pair of depending lugs adapted to bear against the tread of a car wheel on opposite sides of the vertical center line thereof and having an integral hooked inner end portion adapted to loosely embrace the flanged edge of the rim of said wheel at the top thereof, a dog pivoted on the hooked end portion of said hanger and provided at its free outer end with teeth adapted to engage the inner periphery of said ring, a vertically movable lifting screw mounted on the outer end of said hanger, and a flexible member carried by said screw for suspending the journal box therefrom.

3. A journal box suspension jack comprising a hanger member adapted to bear against the tread of a car wheel on opposite sides of the vertical center line thereof and having an integral hooked inner end portion adapted to embrace the flanged edge of the rim of said wheel at the top thereof, a dog pivoted on the hooked inner end portion of said hanger and adapted to engage the inner periphery of the rim of said wheel at the vertical center line thereof, a vertically movable lifting screw mounted on the outer end of said hanger, and a flexible member carried by said screw for suspending the journal box therefrom.

4. A journal box suspension jack comprising a hanger member adapted to bear against the tread of a car wheel and having an integral hooked inner end portion adapted to embrace the flanged edge of the rim of said wheel at the top thereof, a dog pivoted on the free end of the hooked portion of said hanger and adapted to bear against the inner periphery of said rim, a vertically movable lifting screw mounted on the outer end of said hanger, a cross bar threaded on the lower end of said lifting screw, a cable having one end fixed to said bar, and a chain attached to the free end of said cable, the outer end of said bar having a recess therein adapted to receive said chain, the upper surface of said bar being provided on opposite sides of the recess with seats adapted to support one of the links of said chain and prevent twisting and longitudinal slipping of said link relative to said bar.

5. A journal box suspension jack comprising a hanger member adapted to bear against the tread of a car wheel and a hooked inner end portion adapted to embrace the flanged edge of the rim of said wheel at the top thereof, a dog pivoted on the hooked portion of said hanger and adapted to bear against the inner periphery of said rim, a vertically movable lifting screw mounted on the outer end of said hanger, a cross bar threaded on the lower end of said lifting screw, a cable having one end fixed to said bar, and a chain attached to the free end of said cable, the outer end of said bar having a recess therein adapted to receive said chain, said end of said bar being provided on opposite sides of the recess with seats for one of the links of said chain, said recess being shaped to receive two of the links of said chain and to prevent turning of said links therein.

6. A journal box suspension jack comprising a hanger member of substantially channel shaped section provided at one end with wheel gripping means, the other end of said hanger being provided with an integral housing, a worm gear journaled in said housing, a vertically movable lifting screw extending through said housing and threaded through said worm gear, means for preventing rotation of said screw, a flexible member carried by said screw for suspending the journal box therefrom, a worm journaled in said housing and meshing with said worm gear, and a crank on said worm for rotating the same.

7. A journal box suspension jack comprising a hanger adapted to be supported at its inner end on a car wheel, the outer end of said hanger being provided with a housing, a worm gear in said housing, antifriction bearings for rotatably supporting said worm gear in said housing, a vertically movable lifting screw extending through said housing and threaded through said worm gear, means for preventing rotation of said screw, a worm in said housing for rotating said worm gear, antifriction bearings for rotatably supporting said worm in said housing, a crank for rotating said worm, and means carried by the lower end of said screw for suspending the journal box therefrom.

Signed at St. Louis, Missouri, this 20th day of March, 1928.

THOMAS CARDWELL.